United States Patent
De Lorenzo

(10) Patent No.: US 10,123,298 B1
(45) Date of Patent: Nov. 6, 2018

(54) ESTIMATING THE LOCATION OF A WIRELESS TERMINAL BASED ON DETECTION OF WHETHER IT IS MOVING OR STATIONARY

(71) Applicant: Polaris Wireless, Inc., Mountain View, CA (US)

(72) Inventor: David S. De Lorenzo, Palo Alto, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

(21) Appl. No.: 14/959,426

(22) Filed: Dec. 4, 2015

(51) Int. Cl.
*H04W 24/00* (2009.01)
*H04W 64/00* (2009.01)
*H04B 7/185* (2006.01)

(52) U.S. Cl.
CPC ........ *H04W 64/006* (2013.01); *H04B 7/1855* (2013.01); *H04B 7/18556* (2013.01)

(58) Field of Classification Search
CPC ....... H04W 4/02; H04W 48/04; H04W 60/00; H04W 64/00; G01C 21/00
USPC ...................................................... 455/456.1
See application file for complete search history.

(56) References Cited

U.S. PATENT DOCUMENTS

| | | | | |
|---|---|---|---|---|
| 7,433,695 B2* | 10/2008 | Gordon | ................. | G01S 5/0252 455/404.2 |
| 8,224,351 B1* | 7/2012 | Sushkov | ................... | G01S 5/02 340/539.13 |
| 2008/0129582 A1* | 6/2008 | Hsieh | ...................... | G01S 13/34 342/94 |
| 2015/0005000 A1* | 1/2015 | Gyorfi | ................. | H04W 64/006 455/456.1 |

* cited by examiner

*Primary Examiner* — Huy C Ho
(74) *Attorney, Agent, or Firm* — McGeary Cukor LLC; Kenneth Ottesen; Jason Paul DeMont

(57) ABSTRACT

A technique for estimating the location of a wireless terminal at an unknown location in a geographic region. The wireless terminal measures samples of a predetermined form of energy in its vicinity. The disclosed technique then generates a characterization of a predetermined type of variation in the vicinity of the wireless terminal, based on the samples measured. Based on the characterization, the technique generates an estimate of whether the wireless terminal is moving or stationary. The technique then generates an estimate of the location of the wireless terminal, based on the estimate of whether the wireless terminal is moving or stationary. The location estimate can be based on i) applying a location estimate that is optimized for motion if the wireless terminal is estimated to be moving and ii) applying a different technique if the wireless terminal is estimated to be stationary.

16 Claims, 14 Drawing Sheets

100

US 10,123,298 B1

ESTIMATING THE LOCATION OF A WIRELESS TERMINAL BASED ON DETECTION OF WHETHER IT IS MOVING OR STATIONARY

FIELD OF THE INVENTION

The present invention relates to telecommunications in general, and, more particularly, to a technique for determining an estimate of the location of a wireless terminal based on whether the wireless terminal is detected as moving or stationary.

BACKGROUND OF THE INVENTION

FIG. 1 depicts a diagram of the salient components of wireless telecommunications system 100 in the prior art. Wireless telecommunications system 100 comprises: wireless terminal 101, cellular base stations 102-1, 102-2, and 102-3, WiFi base stations 103-1 and 103-2, wireless infrastructure 111, location-based application server 112, and GPS constellation 121, interrelated as shown. Wireless telecommunications system 100 provides wireless telecommunications service to all of geographic region 120, in well-known fashion.

Wireless terminal 101 is capable of being moved and, as a result, is not necessary associated with a fixed location. There are many techniques in the prior art for estimating the current location of wireless terminal 101. The theme that is common to many of these techniques is that location of the wireless terminal is estimated based on the electromagnetic (e.g., radio, etc.) signals—in one form or another—that are processed (i.e., transmitted or received) by the wireless terminal.

In accordance with one family of techniques, the location of a wireless terminal is estimated based on the transmission range of the base stations with which it is communicating. Because the range of a base station is known to be N meters, this family of techniques provides an estimate for the location that is generally accurate to within N meters. A common name for this family of techniques is "cell identification" or "cell ID." The principal disadvantage of the family of cell ID techniques is that there are many applications for which the accuracy of the estimate for the location it generates is insufficient.

In accordance with a second family of techniques, the location of a wireless terminal is estimated by analyzing the angle of arrival or time of arrival of the signals transmitted by the wireless terminal. A common, if somewhat inaccurate, name for this family of techniques is called "triangulation." The principal disadvantage of the triangulation techniques is that there are many applications for which the accuracy of the estimate for the location it generates is insufficient.

In accordance with a third family of techniques, the location of a wireless terminal is estimated by a receiver in the wireless terminal that receives signals from satellites in orbit. A common name for this family of techniques is "GPS." The principal advantage of the GPS techniques is that when it works, the estimate for the location can be accurate to within meters. The GPS techniques are disadvantageous in that they do not work consistently well indoors, in heavily-wooded forests, or in urban canyons.

In accordance with a fourth family of techniques, the location of a wireless terminal is estimated by pattern matching one or more location-dependent traits of one or more electromagnetic signals that are processed (i.e., transmitted and/or received) by the wireless terminal. Common names for this family of techniques include "RF Pattern Matching (RFPM)" and "RF Fingerprinting."

The basic idea with pattern matching is that some traits of an electromagnetic signal remain (more or less) constant as a signal travels from a transmitter to a receiver (e.g., frequency, etc.) and some traits change (e.g., signal strength, relative multi-path component magnitude, propagation delay, etc.). A trait that changes is considered a "location-dependent" trait. Each location can be described or associated with a profile of one or more location-dependent traits of one or more electromagnetic signals. A wireless terminal at an unknown location can observe the traits and then attempt to ascertain its location by comparing the observed traits with a database that correlates locations with expected or predicted traits.

There are various modifications that can be made to the basic pattern matching technique to improve the accuracy of the estimate for the location. The principal advantage of at least some such pattern matching techniques is that they are highly accurate and work well indoors, in heavily wooded forests, and in dense urban areas (i.e., in "urban canyons").

In regard to the various families of techniques described above, some location estimation techniques work well even in environments where the measured strengths of the different signals vary significantly, such as where signal obstructions are present, including natural obstructions such as mountains and artificial obstructions such as buildings. Meanwhile, other techniques might work best under a different set of operating conditions.

Therefore, the need exists for assessing the operating conditions of a wireless terminal, in order to determine how best to estimate its location, and then estimating its location accordingly.

SUMMARY OF THE INVENTION

Location estimation techniques that are based on radio frequency pattern matching (RPFM) can be highly accurate, at least in certain operating environments. This is, at least in part, because a time-series analysis can be incorporated to estimate the probability that a wireless terminal is in each location at each of instants $H_1$ through $H_Y$ in the temporal interval $\Delta T$. Each probability is based on comparing the measurements of traits associated with the wireless terminal at each of instants $H_1$ through $H_Y$, to predicted values for those traits at those times. Each of the Y probability distributions provides a first estimate of the probability that the wireless terminal is in each location at each of instants $H_1$ through $H_Y$. The Y probability distributions are then combined in order to narrow down the possible locations, thereby yielding a highly accurate estimate of the wireless terminal's location.

An RFPM technique that includes time-series analysis as summarized above yields a highly accurate estimate when the wireless terminal is moving. Conversely, the RFPM technique might or might not yield accurate enough results when the wireless terminal is stationary. To address this problem, embodiments of the present invention estimate whether a wireless terminal is moving or stationary, and, based on this estimate, select an appropriate location estimation technique to apply.

The technique of the illustrative embodiment can be implemented at the wireless terminal or at a physically distinct location engine, or both, and is summarized here. During the course of its operation, a wireless terminal whose location is to determined measures samples of one or more predetermined forms of energy in its vicinity. Based on the measured samples, the disclosed technique generates characterizations of one or more predetermined types of variation in the vicinity of the wireless terminal. Based on these characterizations, the technique then generates an estimate of whether the wireless terminal is moving or stationary.

For example, the wireless terminal can measure a sample of radiant energy in its vicinity. Based on this measured sample, the wireless terminal, or a physically distinct location engine, generates a characterization of a first type of variation. Such a characterization might be that of a Doppler effect if the radiant energy being measured is in the form of radio waves. The radio waves being measured might be those emitted by the base station serving the wireless terminal or radio waves emitted by a different source. The Doppler effect being characterized in this example is significant, in that the presence of Doppler effect is probative of movement. Based on this characterization, possibly in combination with one or more other characterizations of other types of variation, it can be concluded that the wireless terminal is moving or that it is not moving.

In the foregoing example, a sample of radiant energy in the form of radio waves is measured and Doppler effect is characterized. As those who are skilled in the art will appreciate after reading this specification, the disclosed technique can also be used on other types of radiant energy, such as but not limited to visible light and radiant heat, and also on other types of energy in general, such as but not limited to sound energy, electrical energy, and mechanical energy. Furthermore, other types of variations can be characterized, specific on the particular type of energy being measured.

Continuing with the summary of the disclosed technique, once it is ascertained that the wireless terminal is moving or that it is stationary, the technique of the illustrative embodiment then generates an estimate of the location of the wireless terminal. In some embodiments of the present invention, the location estimate is based on i) applying the RFPM-based location estimate technique described above—or a different technique that is optimized for a moving wireless terminal, for that matter—if the wireless terminal is estimated to be moving, or ii) applying a different technique if the wireless terminal is estimated to be stationary. In some other embodiments, one technique is applied over another depending on a velocity being estimated and compared against a non-zero threshold. Advantageously, and in certain operating environments, such a hybrid technique can achieve results that are superior to either i) RFPM performed in isolation or ii) an alternative technique to RFPM.

A location estimation technique that utilizes radio frequency pattern matching (RFPM) is used in the illustrative embodiment if it is determined that a wireless terminal is moving sufficiently. However, it will be clear to those skilled in the art, after reading this specification, how to make and use embodiments of the present invention in which the estimate of whether the wireless terminal is moving or stationary can be used to determine whether a location estimation technique different than RFPM should be used or not.

A first illustrative method of estimating the location of a wireless terminal comprises: measuring, by the wireless terminal, a sample of a predetermined form of energy in the vicinity of the wireless terminal; generating, by at least one of the wireless terminal and a location engine, a characterization of a predetermined type of variation in the vicinity of the wireless terminal in relation to a transmitted reference, based on the sample of the form of energy in the vicinity of the wireless terminal; generating, by at least one of the wireless terminal and the location engine, an estimate of the location of the wireless terminal based on the characterization; and transmitting the estimate of the location to a location-based application.

A second illustrative method of estimating the location of a wireless terminal comprises: generating, by at least one of the wireless terminal and a location engine, a characterization of a predetermined type of variation in the vicinity of the wireless terminal, based on a sample of a predetermined form of energy measured in the vicinity of the wireless terminal; generating, by at least one of the wireless terminal and the location engine, an estimate of the probability that the wireless terminal is moving based on the characterization of the type of variation in the vicinity of the wireless terminal; generating, by at least one of the wireless terminal and the location engine, an estimate of the location of the wireless terminal based on the estimate of the probability that the wireless terminal is moving; and transmitting the estimate of the location to a location-based application.

A third illustrative method of estimating the location of a wireless terminal comprises: receiving, by a location engine, a value of a location-dependent trait of an electromagnetic signal, wherein the value of the location-dependent trait is dependent on the location of the wireless terminal; receiving, by the location engine, an estimate of the probability that the wireless terminal is moving; generating, by the location engine, an estimate of the location of the wireless terminal based on: (1) the value of the location-dependent trait, and (2) the estimate of the probability that the wireless terminal is moving; and transmitting the estimate of the location to a location-based application.

DETAILED DESCRIPTION

Figure 1:
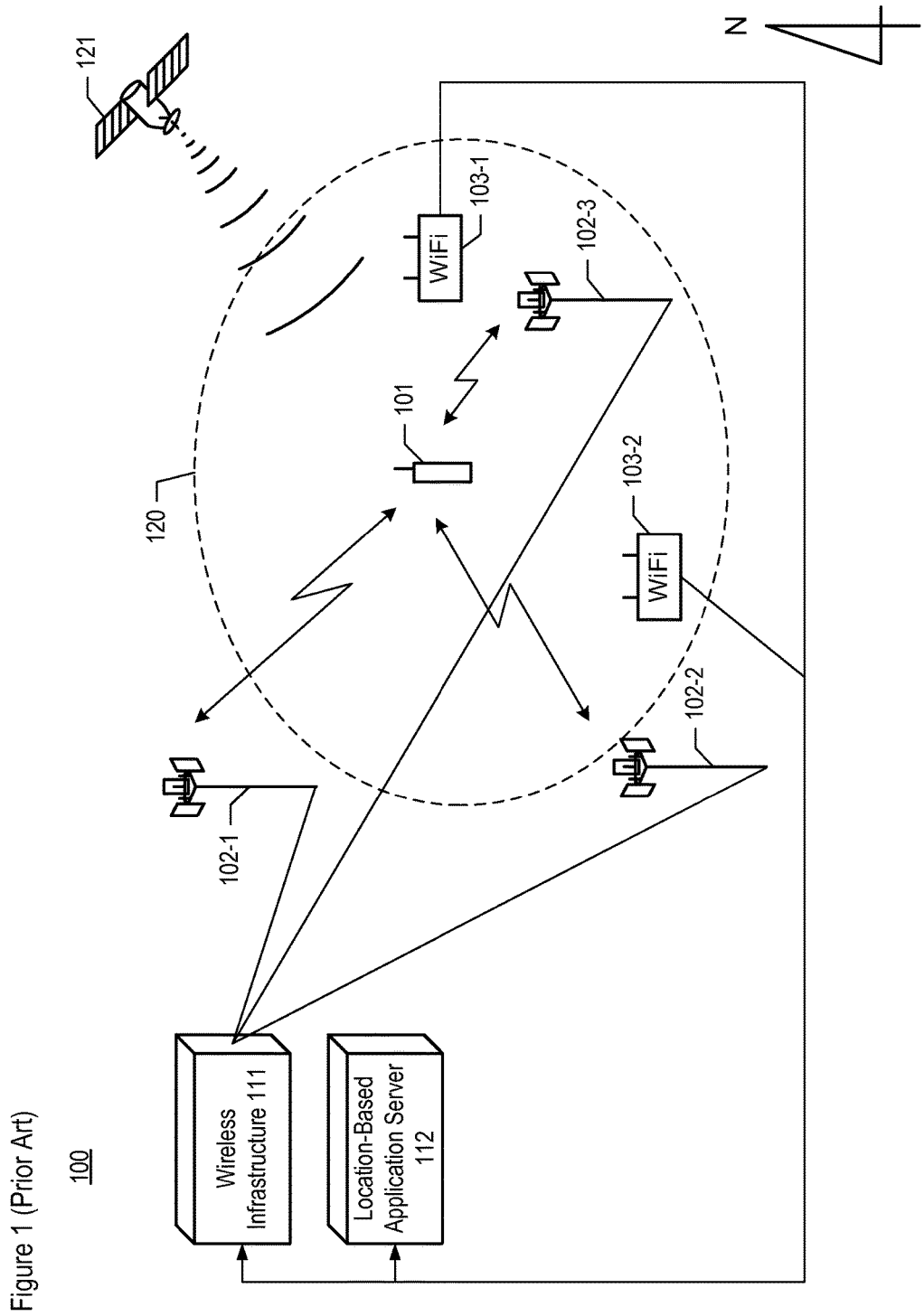
FIG. 1 depicts a diagram of the salient components of wireless telecommunications system 100 in the prior art.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Estimate of the Probability that the Wireless Terminal is Moving—For the purposes of this specification, an "estimate of the probability that the wireless terminal is moving" is defined as the complement of an estimate of the probability that the wireless terminal is stationary (i.e., P(moving)=1−P(stationary)).

Energy—For the purposes of this specification, the term "energy" is defined as the property of matter and radiation that is manifest as a capacity to perform work.

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Location—For the purposes of this specification, the term "location" is defined as a zero-dimensional point, a finite one-dimensional path segment, a finite two-dimensional surface area, or a finite three-dimensional volume.

Location-Dependent Trait of a Radio Signal—For the purposes of this specification, the term "location-dependent trait of a radio signal" is defined as a characteristic of a radio signal that varies with:
  (i) the location of the transmitter of the signal, or
  (ii) the location of the receiver of the signal, or
  (iii) both i and ii.
For example and without limitation, the amplitude and phase of a radio signal are generally location-dependent traits of the signal. In contrast, the frequency of a radio signal is generally not a location-dependent trait of the signal.

Location-Trait Database—For the purposes of this specification, a "Location-Trait Database" is defined as a mapping that associates:
  (i) one or more location-dependent traits of one or more radio signals received or transmitted by a wireless terminal, or
  (ii) the identity of one or more radio signals received or transmitted by a wireless terminal, or
  (iii) both i and ii,
at each of a plurality of locations.

Moving—For the purposes of this specification, the term "moving" is defined as being in motion with respect to a predetermined frame of reference (e.g., a point on the Earth, etc.).

Processor—For the purposes of this specification, a "processor" is defined as hardware or hardware and software that performs mathematical and/or logical operations.

Radio—For the purposes of this specification, a "radio" is defined as hardware or hardware and software that is capable of telecommunications via an unguided (i.e., wireless) radio signal of frequency less than 600 GHz.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Variation—For the purposes of this specification, the term "variation" is defined as a change or difference in condition, amount, or level.

Wireless terminal—For the purposes of this specification, the term "wireless terminal" is defined as a device that is capable of telecommunications without a wire or tangible medium. A wireless terminal can be mobile or immobile. A wireless terminal can transmit or receive or transmit and receive. As is well known to those skilled in the art, a wireless terminal is also commonly called a cell phone, a pager, a wireless transmit/receive unit (WTRU), a user equipment (UE), a mobile station, a fixed or mobile subscriber unit, a pager, a cellular telephone, a personal digital assistant (PDA), a computer, and any other type of device capable of operating in a wireless environment are examples of wireless terminals.

Figure 2:
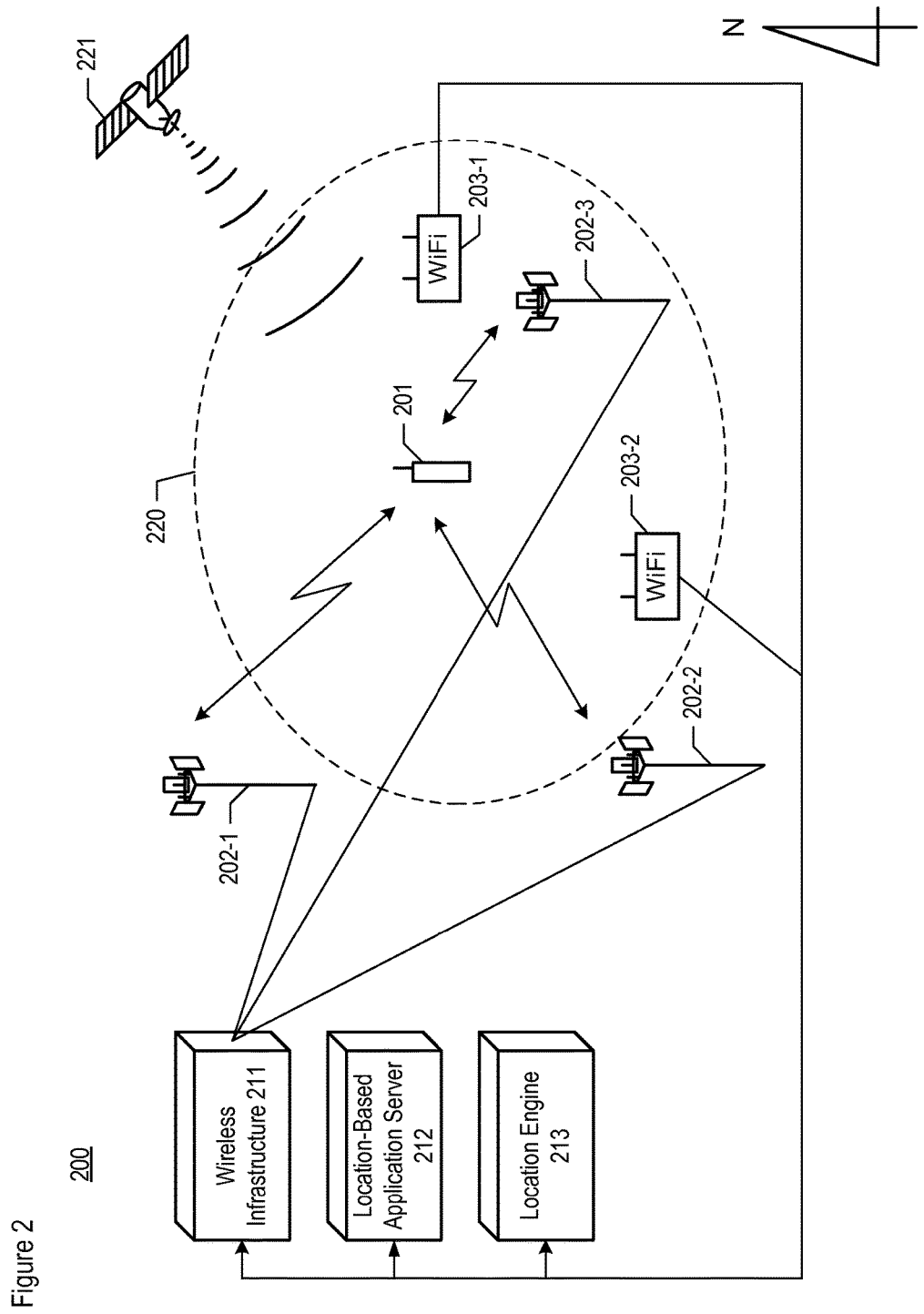
FIG. 2 depicts a diagram of the salient components of wireless telecommunications system 200 in accordance with the illustrative embodiment of the present invention.

Overview—FIG. 2 depicts a diagram of the salient components of wireless telecommunications system 200 in accordance with the illustrative embodiment of the present invention. Wireless telecommunications system 200 comprises: wireless terminal 201, cellular base stations 202-1, 202-2, and 202-3, Wi-Fi base stations 203-1 and 203-2, wireless infrastructure 211, location-based application server 212, location engine 213, and GPS constellation 221, interrelated as shown.

Wireless infrastructure 211, location-based application server 212, location engine 213, and Wi-Fi base stations 203-1 and 203-2 are all connected to one or more interconnected computer networks (e.g., the Internet, a local-area network, a wide-area network, etc.) and, as such, can exchange data in well-known fashion.

Although the illustrative embodiment depicts wireless telecommunications system 200 as comprising only one wireless terminal, it will be clear to those skilled in the art, after reading this disclosure, how to make and use alternative embodiments of the present invention that comprise any number of wireless terminals.

Wireless terminal 201 comprises the hardware and software necessary to perform the processes described below and in the accompanying figures. Furthermore, wireless terminal 201 is mobile and can be at any location within geographic region 220 at any time.

Wireless terminal 201 is capable of providing bi-directional voice, data, and video telecommunications service to a user (not shown), but it will be clear to those skilled in the art, after reading this disclosure, how to make and use embodiments of the present invention in which wireless terminal 201 provides a different set of services.

In accordance with the illustrative embodiment, wireless terminal 201 is capable of receiving one or more radio signals from each of base stations 202-1, 202-2, and 202-3, Wi-Fi base stations 203-1 and 203-2, and GPS constellation 221, in well-known fashion. Wireless terminal 201 is also capable of identifying each radio signal it receives, in well-known fashion, and of transmitting the identity of each signal it receives to location engine 213 (i.e., through wireless infrastructure 211). Wireless terminal 201 is further capable of measuring one or more location-dependent traits of each radio signal it receives, in well-known fashion, and of transmitting each measurement it generates to location engine 213.

In accordance with the illustrative embodiment, wireless terminal 201 is capable of transmitting one or more radio signals—that can be received by one or more of base stations 202-1, 202-2, and 202-3 and Wi-Fi base stations 203-1 and 203-2—in accordance with specific parameters (e.g., signal strength, frequency, coding, modulation, etc.), in well-known fashion, and of transmitting those parameters to location engine 213.

Cellular base stations 202-1, 202-2, and 202-3 communicate with wireless infrastructure 211 via wireline and with wireless terminal 201 via radio in well-known fashion. As is well known to those skilled in the art, base stations are also commonly referred to by a variety of alternative names such as access points, nodes, network interfaces, etc. Although the illustrative embodiment comprises three base stations, it will be clear to those skilled in the art, after reading this disclosure, how to make and use alternative embodiments of the present invention that comprise any number of base stations.

In accordance with the illustrative embodiment of the present invention, cellular base stations 202-1, 202-2, and 202-3 are terrestrial, immobile, and base station 202-3 is within geographic region 220. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 220.

Cellular base stations 202-1, 202-2, and 202-3 comprise the hardware and software necessary to be 3GPP-compliant and to perform the processes described below and in the accompanying figures. For example and without limitation, each of cellular base stations 202-1, 202-2, and 202-3 are capable of continually:

i. receiving one or more radio signals transmitted by wireless terminal 201, and ii. identifying each radio signal transmitted by wireless terminal 201, in well-known fashion, and of transmitting the identity of those signals to location engine 213, and iii. measuring one or more location-dependent traits of each radio signal transmitted by wireless terminal 201, in well-known fashion, and of transmitting the measurements to location engine 213, and iv. transmitting one or more signals to wireless terminal 201 in accordance with specific parameters (e.g., signal strength, frequency, coding, modulation, etc.), in well-known fashion, and of transmitting those parameters to location engine 213.

It will be clear to those skilled in the art how to make and use cellular base stations 202-1, 202-2, and 202-3.

Wi-Fi base stations 203-1 and 203-2 communicate with wireless terminal 201 via radio in well-known fashion. Wi-Fi base stations 203-1 and 203-2 are terrestrial, immobile, and within geographic region 220. Although the illustrative embodiment comprises two Wi-Fi base stations, it will be clear to those skilled in the art, after reading this disclosure, how to make and use alternative embodiments of the present invention that comprise any number of Wi-Fi base stations.

Wi-Fi base stations 203-1 and 203-2 comprise the hardware and software necessary to be WiFi-compliant and to perform the processes described below and in the accompanying figures. For example and without limitation, each of Wi-Fi base stations 203-1 and 203-2 are capable of continually:

i. receiving one or more radio signals transmitted by wireless terminal 201, and ii. identifying each radio signal transmitted by wireless terminal 201, in well-known fashion, and of transmitting the identity of those signals to location engine 213, and iii. measuring one or more location-dependent traits of each radio signal transmitted by wireless terminal 201, in well-known fashion, and of transmitting the measurements to location engine 213, and iv. transmitting one or more signals to wireless terminal 201 in accordance with specific parameters (e.g., signal strength, frequency, coding, modulation, etc.), in well-known fashion, and of transmitting those parameters to location engine 213.

It will be clear to those skilled in the art how to make and use Wi-Fi base stations 203-1 and 203-2.

In some embodiments of the present invention, at least one of cellular base stations 202-1 through 202-3 and Wi-Fi base stations 203-1 and 203-2 serves as an emitting source of a transmitted reference, such as a signal and/or information that is transmitted. The transmitted reference is emitted via a predetermined form of energy, which can be measured by wireless terminal 201, for example, as described below. For example and without limitation, an electromagnetic signal that is transmitted in the course of a base station telecommunicating with a wireless terminal can also serve as a transmitted reference. As another example, a separate signal can be used as a transmitted reference. In some other embodiments of the present invention, wireless terminal 201 can emit a transmitted reference, while in still some other embodiments of the present invention, a different device other than a base station or wireless terminal can emit a transmitted reference. There are also embodiments of the present invention in which a transmitted reference is not required at all.

Wireless infrastructure 211 comprises a switch that orchestrates the provisioning of telecommunications service to wireless terminal 201 and the flow of information to and from location engine 213, as described below and in the accompanying figures. As is well known to those skilled in the art, wireless switches are also commonly referred to by other names such as mobile switching centers, mobile telephone switching offices, routers, etc.

Location-based application server 212 comprises hardware and software that uses the estimate of the location of wireless terminal 201—generated by location engine 213—in a location-based application, in well-known fashion. Location-based applications are well-known in the art and provide services such as, and without limitation, E-911 routing, navigation, location-based advertising, weather alerts, and so on.

Location engine 213 is a data processing system that comprises hardware and software that generates one or more estimates of the location of wireless terminal 201 as described below and in the accompanying figures. It will be clear to those skilled in the art, after reading this disclosure, how to make and use location engine 213. Furthermore, although location engine 213 is depicted in FIG. 2 as physically distinct from wireless infrastructure 211, it will be clear to those skilled in the art, after reading this disclosure, how to make and use alternative embodiments of the present invention in which location engine 213 is wholly or partially integrated into wireless infrastructure 211. Location engine 213 comprises the location-trait database and the geographic information system (GIS) database, which are described in detail below.

Figure 3:
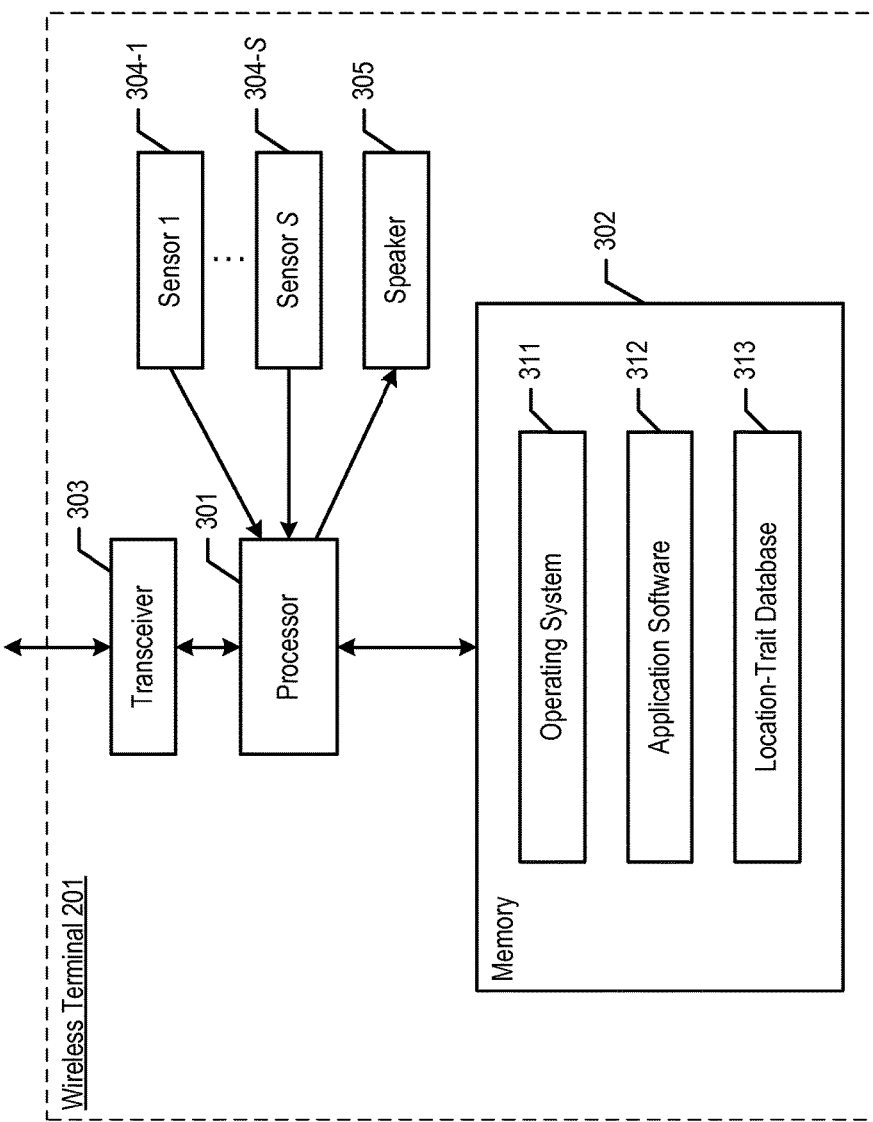
FIG. 3 depicts a block diagram of the salient components of wireless terminal 201 in accordance with the illustrative embodiment.

Wireless Terminal 201—FIG. 3 depicts a block diagram of the salient components of wireless terminal 201 in accordance with the illustrative embodiment of the present invention. Wireless terminal 201 comprises: processor 301, memory 302, transceiver 303, sensors 304-1 through 304-S, wherein S is a positive integer, and speaker 305, which are interconnected as shown. Wireless terminal 201 is capable of executing at least some of the processes described below and in the accompanying figures.

Processor 301 is a general-purpose processor that is capable of executing operating system 311 and application software 312, and of populating, amending, using, and managing Location-Trait Database 313, as described in detail below and in the accompanying figures. It will be clear to those skilled in the art how to make and use processor 301.

Memory 302 is a non-volatile memory that stores:
i. operating system 311, and
ii. application software 312, and
iii. Location-Trait Database 313.

It will be clear to those skilled in the art how to make and use memory 302.

Transceiver 303 enables wireless terminal 201 to transmit and receive information to and from cellular base stations 202-1, 202-2, and 202-3 and/or Wi-Fi base stations 203-1 and 203-2. In addition, transceiver 303 enables wireless terminal 201 to transmit information to and receive information from location engine 213 via one or more base stations and wireless switching center 211. It will be clear to those skilled in the art how to make and use transceiver 303.

Sensor 304-s, wherein s can have a value between 1 and S, enables wireless terminal 201 to measure one or more samples of energy (e.g., kinetic, etc.) in the vicinity of the wireless terminal. Each sensor 304-s measures a particular form of energy that is of the following:
i. radiant energy (e.g., electromagnetic energy including visible light, radio waves, radiant heat, etc.)
ii. thermal energy
iii. sound energy
iv. electrical energy
v. mechanical energy (e.g., motion energy, accelerometer, wind, etc.)

As those who are skilled in the art will appreciate after reading this specification, other forms of energy can be measured and used in order to estimate whether wireless terminal 201 is moving or stationary. In any event, it will be clear to those skilled in the art how to make and use sensor 304-s.

Speaker 305, which is an electroacoustic transducer, enables wireless terminal 201 to produce sound in response to an electrical audio signal input. It will be clear to those skilled in the art how to make and use speaker 305.

Figure 4:
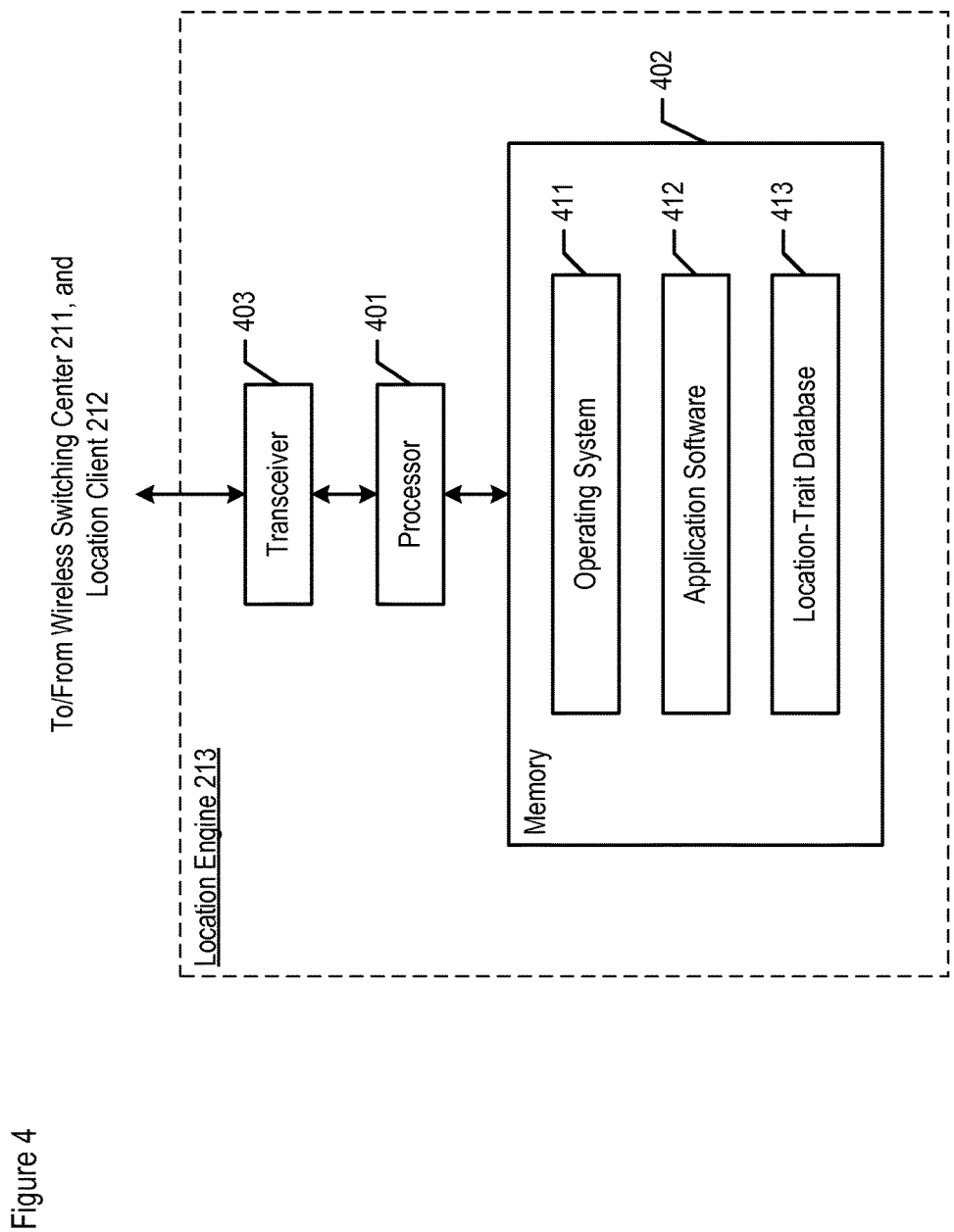
FIG. 4 depicts a block diagram of the salient components of location engine 213 in accordance with the illustrative embodiment.

Location Engine 213—FIG. 4 depicts a block diagram of the salient components of location engine 213 in accordance with the illustrative embodiment of the present invention. Location engine 213 is a data-processing system that comprises: processor 401, memory 402, and local-area network transceiver 403, which are interconnected as shown. Location engine 213 is capable of executing at least some of the processes described below and in the accompanying figures. In some embodiments of the present invention, location engine 213 is a server computer.

Processor 401 is a general-purpose processor that is capable of executing operating system 411 and application software 412, and of populating, amending, using, and managing Location-Trait Database 413, as described in detail below and in the accompanying figures. It will be clear to those skilled in the art how to make and use processor 401.

Memory 402 is a non-volatile memory that stores:
i. operating system 411, and
ii. application software 412, and
iii. Location-Trait Database 413.

It will be clear to those skilled in the art how to make and use memory 402.

Transceiver 403 enables location engine 213 to transmit and receive information to and from wireless switching center 211 and location client 212. In addition, transceiver 403 enables location engine 213 to transmit information to and receive information from wireless terminal 201 and one or more base stations via wireless switching center 211. It will be clear to those skilled in the art how to make and use transceiver 403.

Figure 5:
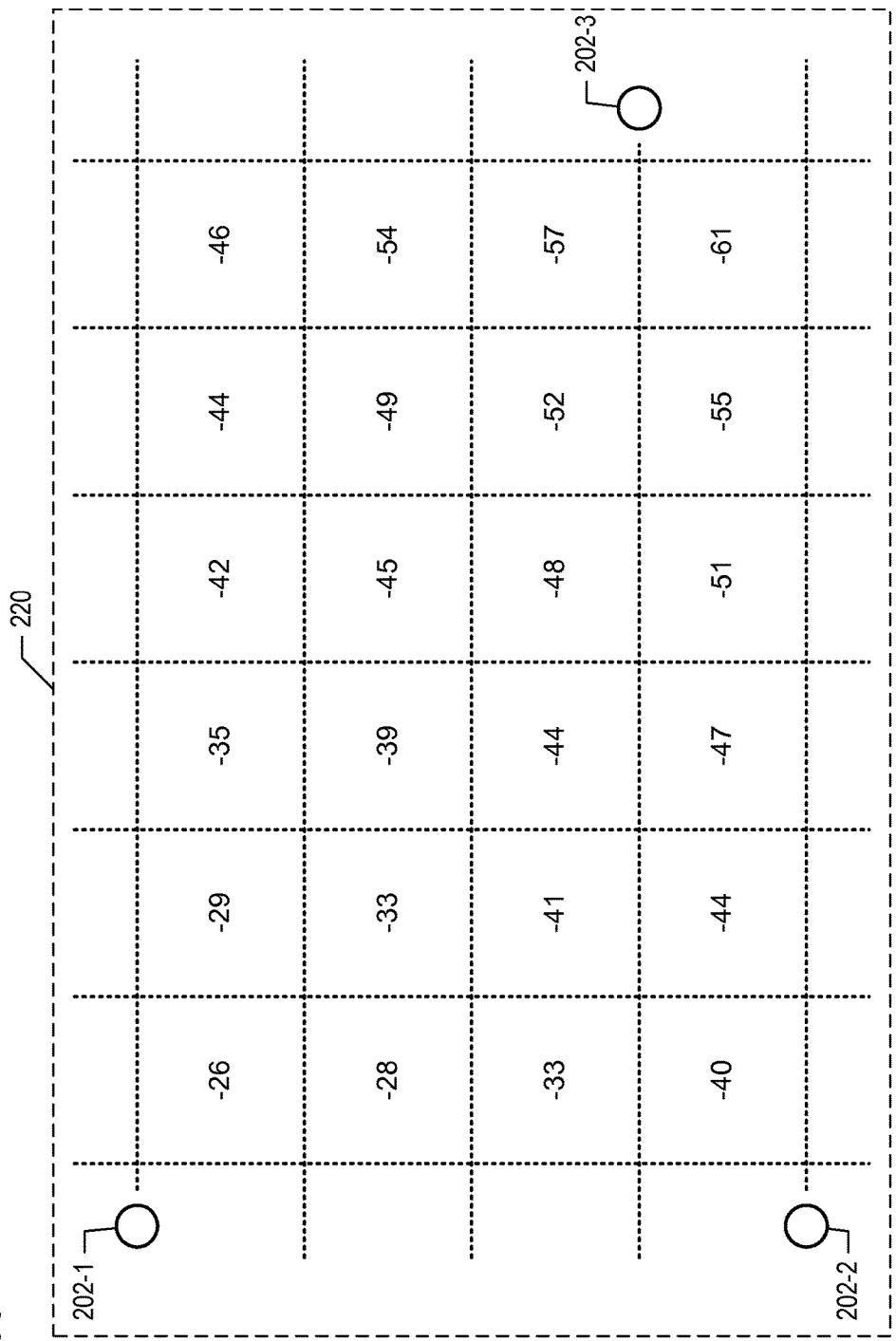
FIG. 5 depicts a radio frequency (RF) map that represents a partitioning of geographic region 220.

Radio Frequency Map of the Illustrative Embodiment—FIG. 5 depicts a radio frequency (RF) map that represents a partitioning of geographic region 220 into 24 square locations. The maps are maintained as part of Location-Trait Databases 313 and 413, which are situated at wireless terminal 201 and location engine 213, respectively. In general, the map associates:
i. a plurality of possible locations of wireless terminal 201, with
ii. a predicted value of a location-dependent trait for each of the possible locations.

In other words, when wireless terminal 201 is at an unknown location, an empirical measurement of the location-dependent trait is a "fingerprint" or "signature" that can be used, in conjunction with the map, to estimate the location of the wireless terminal.

In accordance with the illustrative embodiment of the present invention, the location-dependent trait is the received signal strength as measured in dBm, and each map associates each possible location of wireless terminal 201 with the predicted received signal strength of one signal as transmitted from an antenna of a particular cellular or Wi-Fi base station—in this case, cellular base station 202-1—and as a function of the calendrical time, T, and the environmental conditions, N. With this in mind, FIG. 5 indicates the mapping of the signal radiated by the antenna of base station 202-1 at Noon on a sunny day. Each of the cellular base station 202-2 and 202-3 antennas similarly has a map that associates each possible location of wireless terminal 201 with the predicted received signal strength of one signal as transmitted from the antenna of the particular base station. How each map is generated is described below and in FIG. 7.

As seen in the mapping in FIG. 5, the predicted received signal strength varies from one location to the next. Thus, if wireless terminal 201 is moving, the fingerprint measured by wireless terminal 201 can change from one moment in time to the next.

It will be clear to those skilled in the art, after reading this specification, how to make and use alternative embodiments of the present invention in which one or more predicted traits are used, instead of or in addition to the trait of received signal strength described above.

Figure 6:
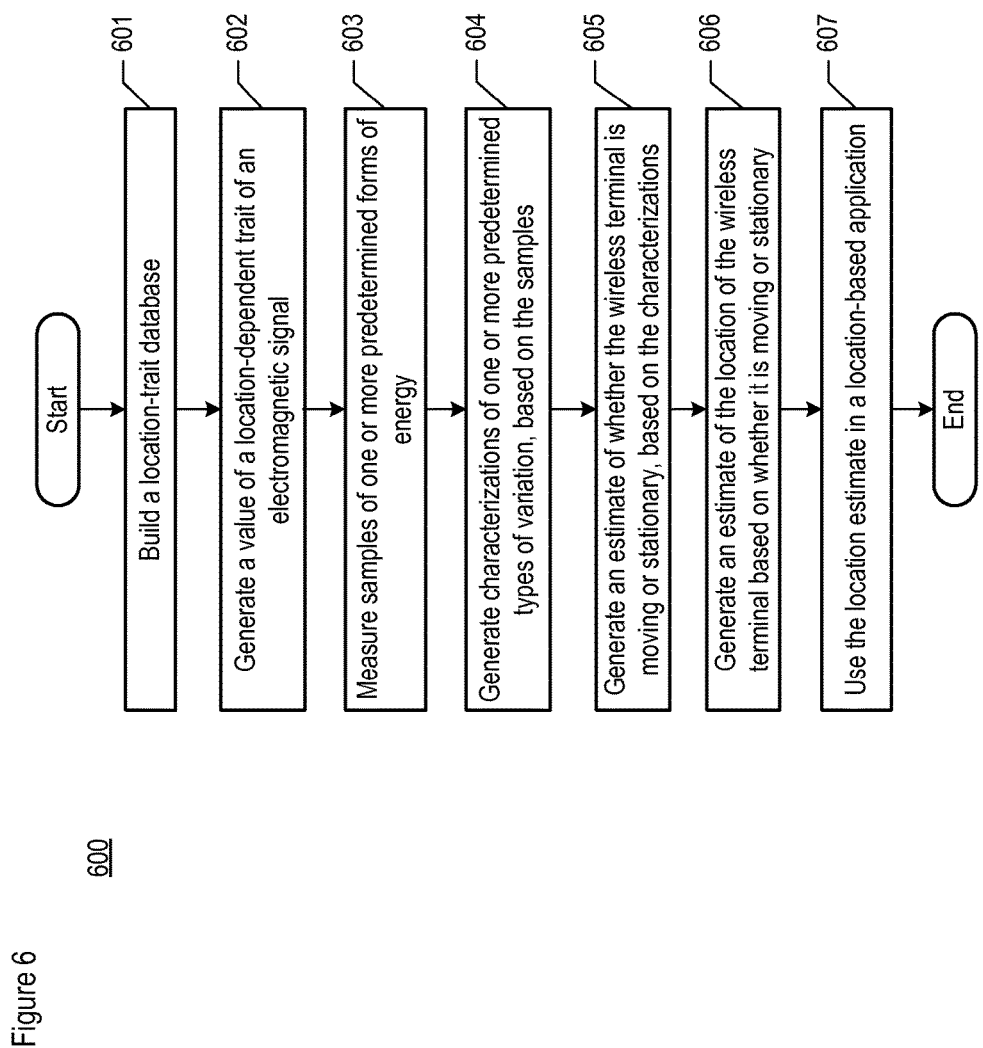
FIG. 6 depicts a flowchart of the salient processes performed in accordance with the illustrative embodiment of the present invention.

Operation of the Illustrative Embodiment—FIG. 6 depicts a flowchart of method 600, comprising the salient processes performed in accordance with the illustrative embodiment of the present invention. The details of the illustrative location estimation technique that are not described herein are described in U.S. Pat. No. 7,257,414, which is incorporated herein by reference.

The processes performed by wireless telecommunications system 200 of the illustrative embodiment are depicted in the drawings (i.e., FIG. 6 and subsequent figures) as being performed in a particular order. It will be clear to those having ordinary skill in the art, after reading the present disclosure, how to make and use alternative embodiments of the disclosed methods wherein the recited operations sub-operations, and messages are differently sequenced, grouped, or sub-divided—all within the scope of the present disclosure. It will be further clear to those skilled in the art, after reading the present disclosure, how to make and use alternative embodiments of the disclosed methods wherein some of the described operations, sub-operations, and messages are optional, are omitted, or are performed by other elements and/or systems.

In accordance with process 601, a location-trait database is built. For the purposes of this specification, the "Location-Trait Database" is defined as a database of maps (e.g., those that are described above and in FIG. 5, etc.) that associate each of a plurality of locations to one or more predicted traits associated with a wireless terminal at that location. The details of building a location-trait database are described below and in FIG. 7.

In accordance with process 602, values are generated of a location-dependent trait of an electromagnetic signal processed through an antenna of wireless terminal 201—that is, an electromagnetic signal that is received by terminal 201 through its antenna or transmitted by terminal 201 through its antenna. The details of process 602 are described below and in FIG. 8.

In accordance with process 603, wireless terminal 201 measures one or more samples of one or more predetermined forms of energy in its vicinity. The details of process 603 are described below and in FIG. 9.

In accordance with process 604, at least one of wireless terminal 201 and location engine 213 generates characterizations of one or more predetermined types of variation in the vicinity of wireless terminal 201, based on the samples. The details of process 604 are described below and in FIG. 10.

In accordance with process 605, at least one of wireless terminal 201 and location engine 213 generates an estimate of whether wireless terminal 201 is moving or stationary, based on the one or more of the characterizations. The details of process 605 are described below and in FIG. 11.

In accordance with process 606, at least one of wireless terminal 201 and location engine 213 generates an estimate of the location of wireless terminal 201, based on i) the estimate of whether wireless terminal 201 is moving or stationary, and ii) one or more values of the location-dependent trait. The details of process 606 are described below and in FIG. 12.

A location estimation technique that utilizes radio frequency pattern matching (RFPM) is used in the illustrative embodiment if it is determined that wireless terminal 201 is moving sufficiently. However, it will be clear to those skilled in the art, after reading this specification, how to make and use embodiments of the present invention in which i) the estimate of whether wireless terminal 201 is moving or stationary is used in concert with ii) a location estimation technique or techniques that operate independently of RFPM.

In accordance with process 607, the estimate of the location of wireless terminal 201 is used in a location-based application, such as and without limitation, E 9-1-1 service. In support of this, the estimate is transmitted to the location-based application (e.g., to location-based application server 212).

Figure 7:
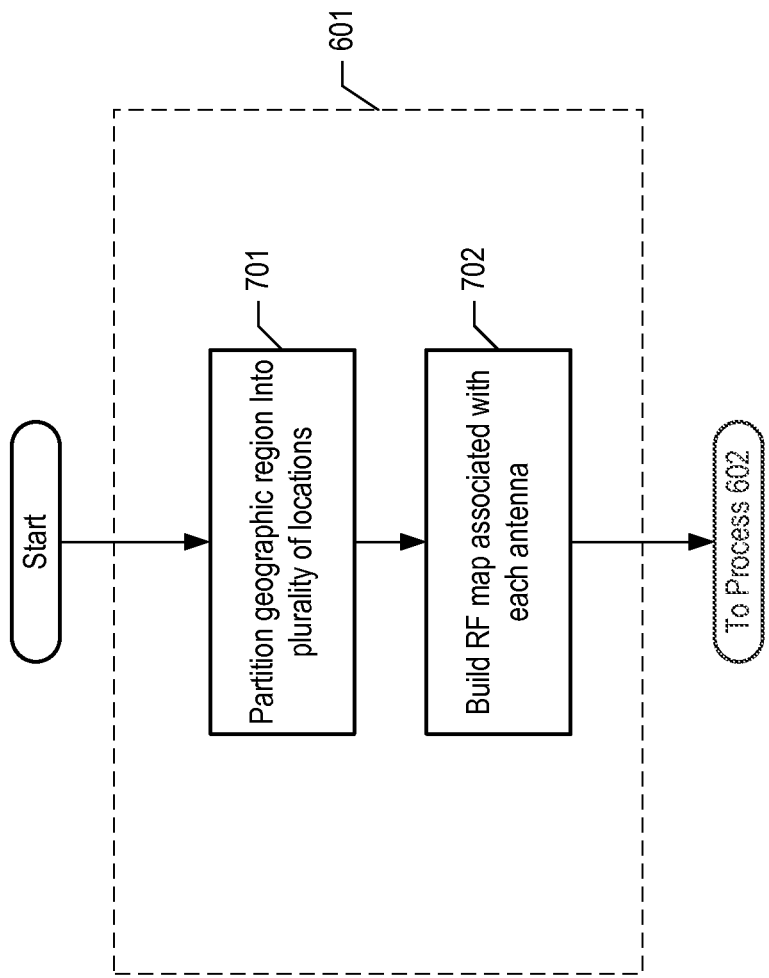
FIG. 7 depicts a flowchart of the salient processes performed in accordance with process 601.

Building Location-Trait Database 313—FIG. 7 depicts a flowchart of the salient processes performed in accordance with process 601—building the Location-Trait Database.

In accordance with the illustrative embodiment, location-trait database 413 is prepared for and stored at location engine 213, as it is location engine 213 that generates an estimate of the location of wireless terminal 201, in accordance with process 606. In some embodiments of the present invention, however, location-trait database 313 is prepared and stored at wireless terminal 201, instead of or in addition to database 413.

In accordance with process 701, geographic region 220 is partitioned into B(T,N) locations, such as the 24 locations depicted in FIG. 5, wherein B(T,N) is a positive integer greater than one, and wherein B(T,N) varies as a function of calendrical time T and the environmental conditions N. Each location is described by:
 i. a unique identifier b,
 ii. its dimensionality (e.g., zero-dimension, one-dimension, two dimensions, three dimensions, etc.),
 iii. the coordinates (e.g., latitude, longitude, altitude, etc.) that define its scope (e.g., position, area, volume, etc.), which can be static or, alternatively, can vary as a function of calendrical time T or the environmental conditions N, or both the calendrical time T and the environmental conditions N,
 iv. the predicted value E(b, T, N, W, Q) for each trait, Q, when wireless terminal W is at location b at calendrical time T given environmental conditions, N,
 v. whether movement by a wireless terminal is probable at the location and, if so, what type of movement (e.g., speed, direction, etc.) depending on time of day, and
 vi. the identities of its adjacent locations.

It will be clear to those skilled in the art, after reading this disclosure, how to make and use alternative embodiments of the present invention that partition geographic region 220 into any number of locations of any size, shape, and arrangement. Furthermore, it will be clear to those skilled in the art, after reading this disclosure, how to make and use embodiments of the present invention in which the locations are identical in size and shape.

In accordance with process 702, the predicted values E(b, T, N, W, Q) for the location-dependent traits are associated with each location, as described above and in FIG. 5. The predicted values of these traits are determined through a combination of:
 i. a plurality of theoretical and empirical radio-frequency propagation models, and
 ii. a plurality of empirical measurements of the traits within geographic region 220,
in well-known fashion.

Figure 8:
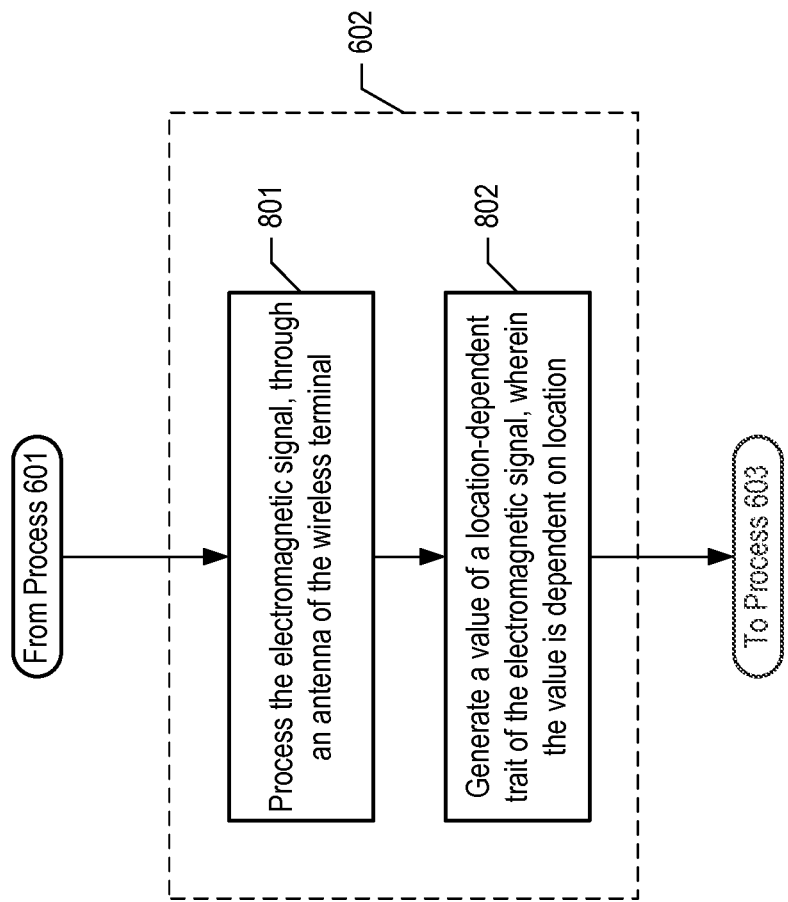
FIG. 8 depicts a flowchart of the salient processes performed in accordance with process 602.

Generating a Value of a Location-Dependent Trait—FIG. 8 depicts a flowchart of the salient processes performed in process 602—processing an electromagnetic signal and generating a value of a location-dependent trait of the electromagnetic signal.

In accordance with process 801, wireless terminal 201 processes an electromagnetic signal through its antenna. In some embodiments of the present invention, processing the electromagnetic signal corresponds to wireless terminal 201 receiving the signal through its antenna. In some other embodiments, processing the electromagnetic signal corresponds to wireless terminal 201 transmitting the signal through its antenna, which signal can be received by at least one of cellular base stations 202-1 through 202-3 and Wi-Fi base stations 203-1 and 203-2, in well-known fashion.

In accordance with process 802, wireless terminal 201 generates one or more values of a location-dependent trait of the electromagnetic signal received or transmitted in accordance with process 801. In accordance with the illustrative embodiment, wireless terminal 201 generates values by making empirical measurements of location-dependent traits that depend on the location of the terminal. Wireless terminal 201 makes Y non-empty sets of measurements of the traits associated with itself. Each set of measurements is made at one of instants $H_1$ through $H_Y$. Terminal 201 transmits these values it generates to location engine 213, in some embodiments. The measurements made at instants $H_1$ through $H_Y$ are used as part of a time-series analysis for estimating the location of terminal 201, as described in detail below and with respect to process 1203.

In some embodiments of the present invention, the value of a location-dependent trait is generated by one or more of cellular base stations 202-1 through 202-3 and Wi-Fi base stations 203-1 and 203-2 making measurements of an electromagnetic signal transmitted by wireless terminal 201 and then making available the measurements for subsequent processing. This can be performed instead of or in addition to wireless terminal 201 generating the value of a location-dependent trait.

Figure 9:
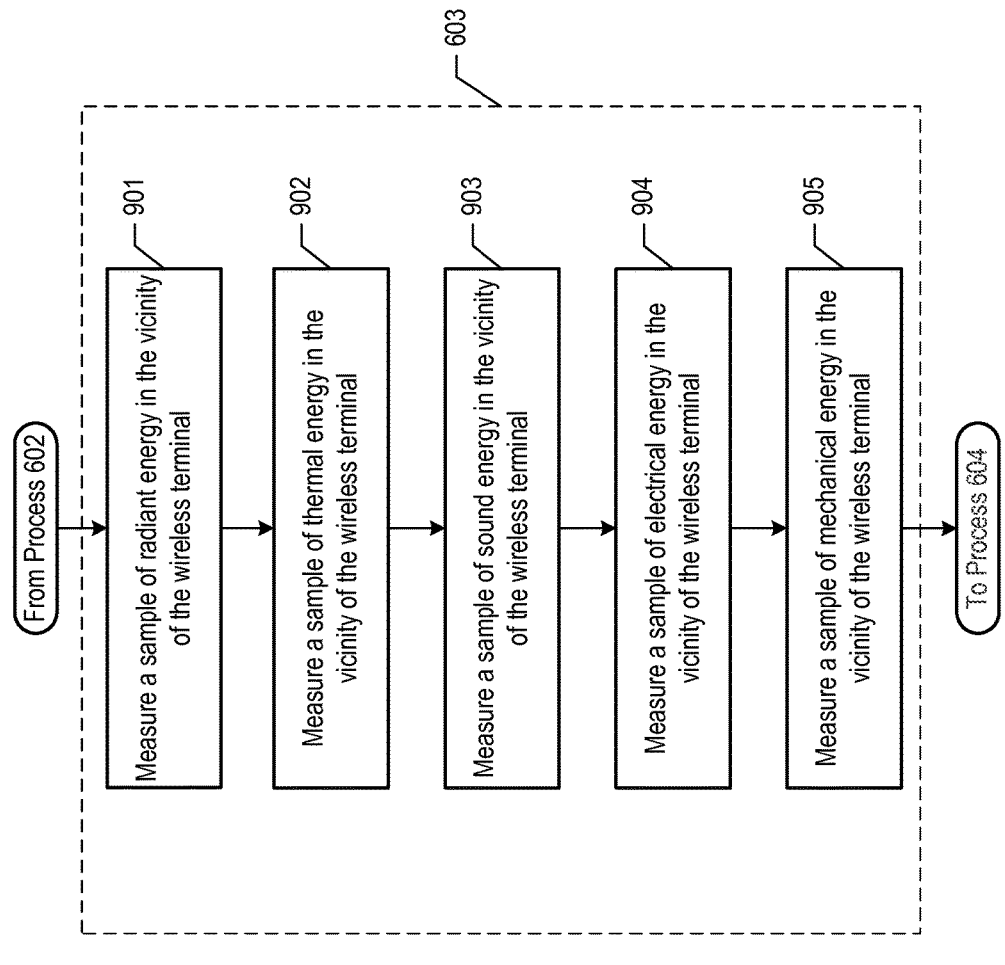
FIG. 9 depicts a flowchart of the salient processes performed in accordance with process 603.

Measuring Samples of Energy—FIG. 9 depicts a flowchart of the salient processes performed in process 603—measuring samples of one or more forms of energy in the vicinity of wireless terminal 201.

In accordance with process 901, wireless terminal 201 measures a sample of radiant energy in the vicinity of the terminal. To measure the sample, terminal 201 utilizes radiant-energy sensor 304-1 in well-known fashion.

In accordance with process 902, wireless terminal 201 measures a sample of thermal energy in the vicinity of the terminal. To measure the sample, terminal 201 utilizes thermal-energy sensor 304-2 in well-known fashion.

In accordance with process 903, wireless terminal 201 measures a sample of sound energy in the vicinity of the terminal. To measure the sample, terminal 201 utilizes sound-energy sensor 304-3 in well-known fashion. Wireless terminal 201, in some embodiments of the present invention, generates a sound and transmits it through speaker 305, and then measures the sound energy present based on the sound that is being transmitted through the speaker.

In accordance with process 904, wireless terminal 201 measures a sample of electrical energy in the vicinity of the terminal. To measure the sample, terminal 201 utilizes electrical-energy sensor 304-4 in well-known fashion.

In accordance with process 905, wireless terminal 201 measures a sample of mechanical energy in the vicinity of the terminal. To measure the sample, terminal 201 utilizes mechanical-energy sensor 304-5 in well-known fashion.

In accordance with the illustrative embodiment, the one or more samples of energy described above are measured whenever a location estimate is required. In some embodiments of the present invention, one or more samples of energy are measured whenever another function at terminal 201 uses a particular sensor, such as a microphone (i.e., a sound-energy sensor) used for a voice call being made by the terminal's user, and then is stored for eventual use in the location estimation technique of the illustrative embodiment.

As those who are skilled in the art will appreciate after reading this specification, wireless terminal 201 can measure any form or forms of energy described above, and in any combination.

Figure 10:
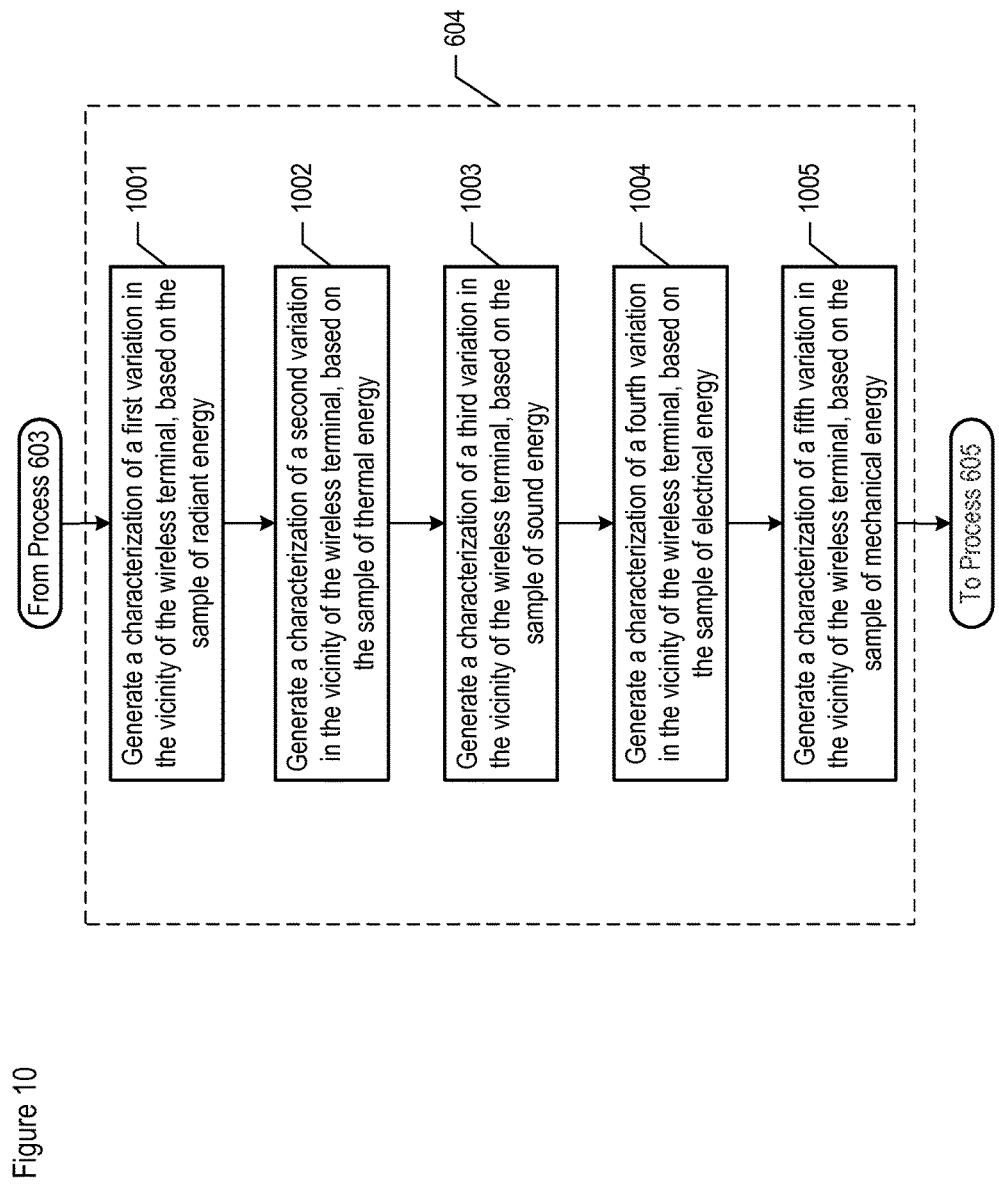
FIG. 10 depicts a flowchart of the salient processes performed in accordance with process 604.

Generating Characterizations of Types of Variation—FIG. 10 depicts a flowchart of the salient processes performed in process 604—generating characterizations of one or more predetermined types of variation in the vicinity of wireless terminal 201.

In accordance with process 1001, wireless terminal 201 generates a characterization of a first type of variation in the vicinity of the terminal, based on the measured sample of radiant energy in the vicinity of the terminal. For example and without limitation, if samples of radio waves are measured in process 901, the characterization that is generated can be used to identify whether a particular type of Doppler effect is detected or not, which is probative of movement on the part of wireless terminal 201. Algorithms for the detection of Doppler effect in radio waves are well known in the art.

Another example of a form of radiant energy is light and, in particular, visible light. A variation in the form of fluctuation in light intensity can probative of movement on the part of wireless terminal 201, in that the wireless terminal can be moving into and out of shadows caused by blocked sunlight or other light. A variation of a different property of light, such as color temperature, can also be probative of movement, in that the wireless terminal can be moving from indoors, characterized by a first color temperature, to outdoors, characterized by a second color temperature, or vice-versa.

In accordance with process 1002, wireless terminal 201 generates a characterization of a second type of variation in the vicinity of the terminal, based on the measured sample of thermal energy in the vicinity of the terminal. For example and without limitation, if samples of ambient air temperature are measured in process 902, the characterization that is generated can be used to identify whether a quick enough change in temperature is detected or not, which is probative of movement on the part of wireless terminal 201 (e.g., walking from indoors to outdoors, or vice-versa). Algorithms for the detection of a change in air temperature that exceeds a predetermined rate are well known in the art.

In accordance with process 1003, wireless terminal 201 generates a characterization of a third type of variation in the vicinity of the terminal, based on the measured sample of sound energy in the vicinity of the terminal. For example and without limitation, if samples of ambient sound are measured in process 903, the characterization that is generated can be used to identify whether a particular type of Doppler effect is detected or not, which is probative of movement on the part of wireless terminal 201. Algorithms for the detection of Doppler effect in sound waves are well known in the art.

In accordance with process 1004, wireless terminal 201 generates a characterization of a fourth type of variation in the vicinity of the terminal, based on the measured sample of electrical energy in the vicinity of the terminal.

In accordance with process 1005, wireless terminal 201 generates a characterization of a fifth type of variation in the vicinity of the terminal, based on the measured sample of mechanical energy in the vicinity of the terminal. For example and without limitation, if samples of the displacement (other than that due to gravity) of a mass in an accelerometer (e.g., a sensor in wireless terminal 201) are measured in process 905, the characterization that is generated can be used to identify whether acceleration is detected or not, which is probative of a change in movement on the part of wireless terminal 201 and, therefore, that the terminal is moving. Algorithms for the detection of acceleration are well known in the art.

Wireless terminal 201 is capable of generating characterizations of different types of variations, in any combination.

In accordance with the illustrative embodiment, it is wireless terminal 201 that generates the characterizations of one or more types of variations. In some embodiments of the present invention, it is location engine 213 that generates the characterization of one or more types of variations, instead of or in addition to terminal 201. In those embodiments, wireless terminal 201 transmits the pertinent sample or samples of energy to location engine 213. In those embodiments, location engine 213 receives the transmitted sample or samples, and generates the corresponding characterizations of variation in the manner described above and with respect to processes 1001 through 1005.

Figure 11:
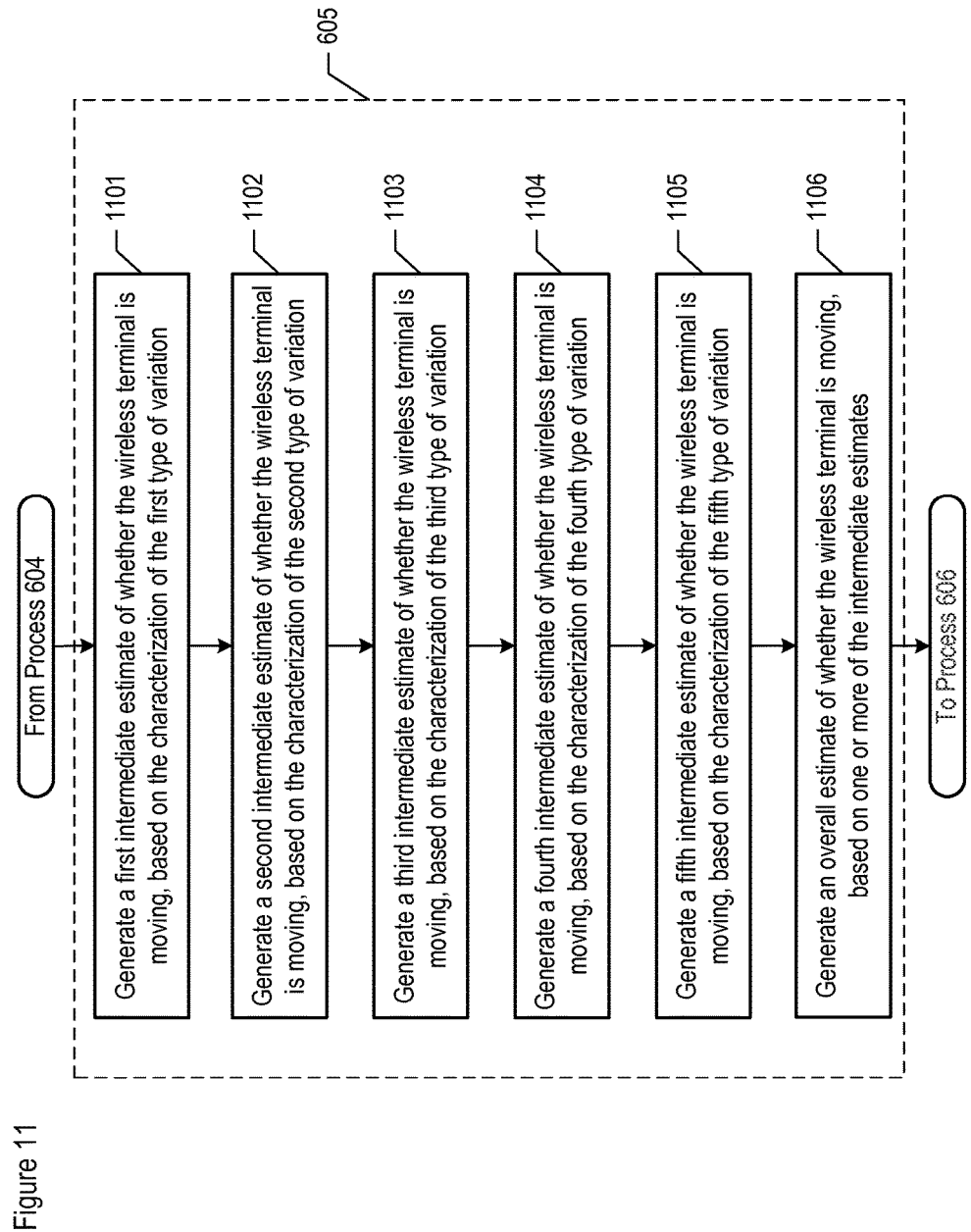
FIG. 11 depicts a flowchart of the salient processes performed in accordance with process 605.

Generating an Estimate of Whether Wireless Terminal 201 is Moving or Stationary—FIG. 11 depicts a flowchart of the salient processes performed in process 605—generating an estimate of whether wireless terminal 201 is moving or stationary.

In accordance with process 1101, wireless terminal 201 generates a first intermediate estimate of the probability that it is moving, based on the characterization of the first type of variation generated in process 1001. For example and without limitation, if the characterization that is generated at process 1001 is being used to identify whether a particular type of Doppler effect is detected, then terminal 201 can estimate that it is moving if the characterization indicates that the detected frequency of the radio waves measured is consistent with the terminal moving relative to the base station with which it is telecommunicating. Consistent with this example, terminal 201 estimates that it is stationary if the characterization of Doppler effect indicates that the radio frequency detected is not varying from where it should be for a transceiver that is not in motion.

In accordance with the illustrative embodiment, wireless terminal 201 accounts for any energy that is present in the sample that was measured earlier i) emitted by the wireless terminal itself and/or ii) emitted by a moving source of a transmitted reference (e.g., a train horn, etc.) other than the wireless terminal. For example and without limitation, wireless terminal 201 emits calculable amounts of various forms of energy in the course of its operation (e.g., heat dissipated, sound from its speaker, light from its display, etc.). As another non-limiting example, wireless terminal 201 can determine that a measured sample was of a horn of a nearby moving train, and consequently, the motion of the moving train is to be discounted. As those who are skilled in the art will appreciate, after reading this specification, a similar accounting can be performed in generating the other estimates of probability described below and for processes 1102 through 1106.

In accordance with process 1102, wireless terminal 201 generates a second intermediate estimate of the probability that it is moving, based on the characterization of the second type of variation generated in process 1002. For example and without limitation, if the characterization that is generated at process 1002 is being used to identify whether a particular type of change in air temperature is detected, then terminal 201 can estimate that it is moving if the characterization indicates that the air temperature change measured is consistent with the terminal moving from a first area (e.g., indoors) of a first temperature level (e.g., 68 degrees F.) to a second area (e.g., outdoors) of a second temperature level (e.g., 90 degrees F. in summer, 40 degrees F. in winter) within a predetermined amount of time.

In accordance with process 1103, wireless terminal 201 generates a third intermediate estimate of the probability that it is moving, based on the characterization of the third type of variation generated in process 1003. For example and without limitation, if the characterization that is generated at process 1003 is being used to identify whether a particular type of Doppler effect is detected, then terminal 201 can estimate that it is moving if the characterization indicates that the detected frequency of the sound waves measured is consistent with the terminal moving relative to the sound source. As those who are skilled in the art will appreciate after reading this specification, a technique can be applied i) to determine the probable sound source and, ii) based on this determination, to discount any motion on the part of the sound source. Consistent with this example, terminal 201 estimates that it is stationary if the characterization of Doppler effect indicates that the sound frequency detected is not varying from where it should be for a sound sensor that is not in motion.

In accordance with process 1104, wireless terminal 201 generates a fourth intermediate estimate of the probability that it is moving, based on the characterization of the fourth type of variation generated in process 1004.

In accordance with process 1105, wireless terminal 201 generates a fifth intermediate estimate of the probability that it is moving, based on the characterization of the fifth type of variation generated in process 1005. For example and without limitation, if the characterization that is generated at process 1005 is being used to identify whether acceleration is detected, then terminal 201 can estimate that it is moving (or recently moving) if the characterization indicates that the detected acceleration is consistent with the wireless terminal changing velocity.

In accordance with process 1106, wireless terminal 201 generates an overall estimate of the probability that it is moving, based on one or more of the estimates generated in processes 1101 through 1105. In accordance with the illustrative embodiment, terminal 201 estimates that it is moving if at least one of the estimates indicates that terminal 201 is moving. In other embodiments of the present invention, other criteria can be applied such as, while not being limited to, the following:
  i. estimating terminal 201 to be moving only when all generated estimates indicate that the terminal is moving,
  ii. estimating terminal 201 to be stationary if at least one of the estimates indicates that the terminal is stationary,
  iii. estimating terminal 201 to be stationary only when all generated estimates indicate that the terminal is stationary.

As those who are skilled in the art will appreciate, after reading this specification, other criteria can be applied, in order to estimate comprehensively that terminal 201 is moving or that terminal 201 is stationary.

Wireless terminal 201, in some embodiments, generates the overall estimate based on some, but not all, of the intermediate estimates described above.

In accordance with the illustrative embodiment, it is wireless terminal 201 that generates the estimate of the probability that it is moving. In some embodiments of the present invention, it is location engine 213 that generates the estimate of the probability that wireless terminal 201 is moving, instead of or in addition to terminal 201 doing so. In some of those embodiments, wireless terminal 201 transmits the characterizations that it generates, to location engine 213. In those embodiments, location engine 213 receives the transmitted characterization or characterizations, and generates the estimate of the probability that wireless terminal 201 is moving, in the manner described above and with respect to processes 1101 through 1106.

As those who are skilled in the art will further appreciate after reading this specification, as an alternative to the foregoing scenario, location engine 213 can both generate and utilize the characterizations of one or more of the types of variations, in generating the estimate of the probability that wireless terminal 201 is moving.

Figure 12:
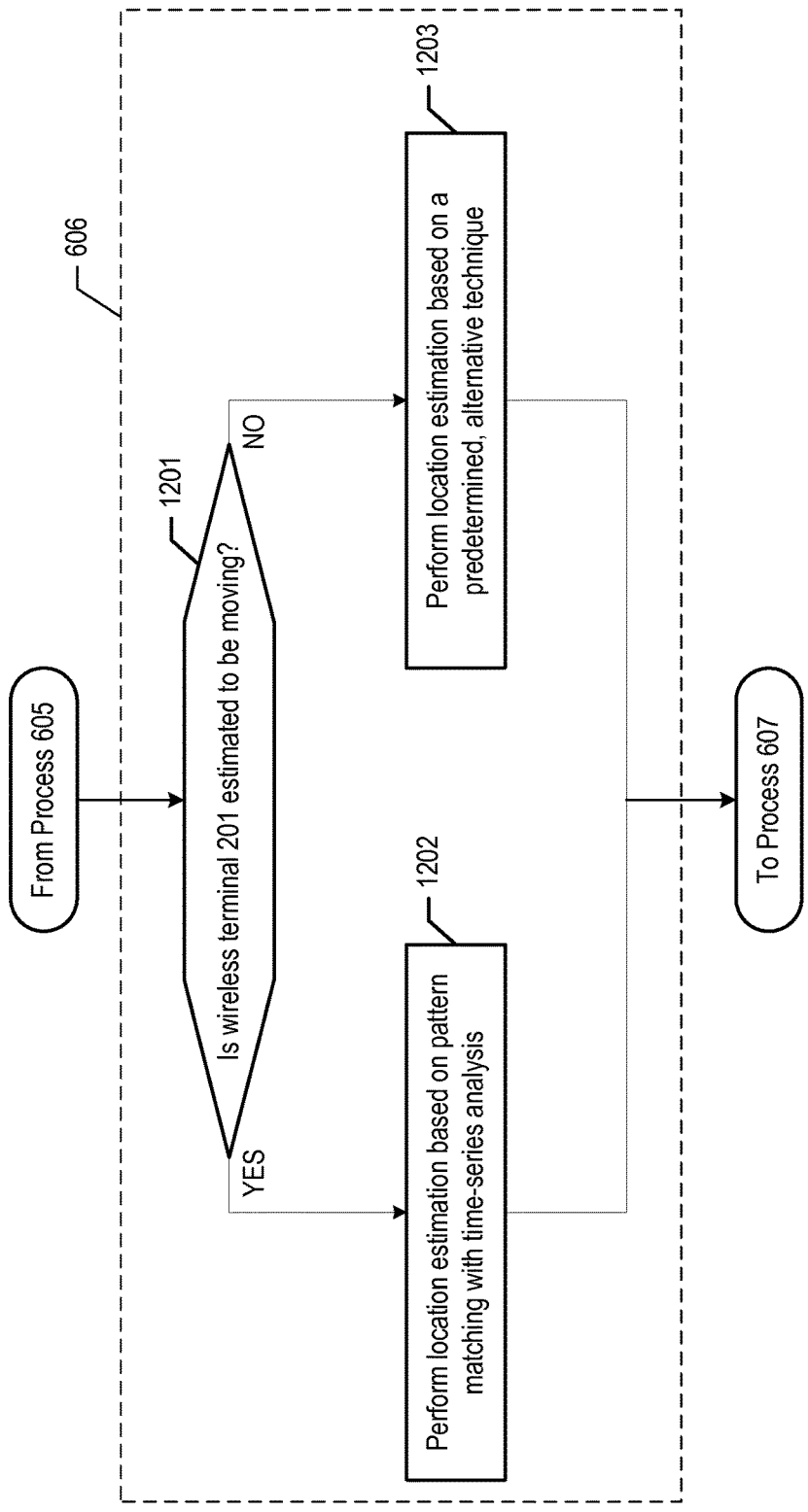
FIG. 12 depicts a flowchart of the salient processes performed in accordance with process 606.

Generating an Estimate of the Location of Wireless Terminal 201—FIG. 12 depicts a flowchart of the salient processes performed in process 606—generating an estimate of the location of wireless terminal 201, based on whether the terminal is estimated to be moving or stationary. In some embodiments of the present invention, the estimate of the location is based on an estimate of the probability that the wireless terminal is moving (e.g., "it is not moving", 0%, 1%, 10%, 50%, 90%, 99%, 100%, "it is moving", etc.). In some other embodiments of the present invention, the estimate of the location is based on an estimate (of the probability) that the wireless terminal is traveling greater than (or equal to) a particular speed.

Process 606 is initiated by a request from location client 212 for the location of wireless terminal 201, in accordance with the illustrative embodiment. It will be clear to those skilled in the art, however, after reading this disclosure, how to make and use alternative embodiments of the present invention in which process 606 is initiated periodically, sporadically, or in response to some other event. Moreover, it will be clear to those skilled in the art, after reading this disclosure, how to make and use alternative embodiments of the present invention in which process 606 is initiated at some other device other than location client 212, such as wireless terminal 201. For example and without limitation, the user of terminal 201 might be using a location-based application that triggers a request for the location of the terminal.

In accordance with the illustrative embodiment, it is location engine 213 that generates the estimate of the location of wireless terminal 201, instead of terminal 201 itself. In some embodiments of the present invention, it is wireless terminal 201 that generates the estimate of its location in accordance with process 1202, instead of or in addition to server 213 generating the estimate. In those embodiments, wireless terminal 201 utilizes location-trait database 313, along with the values of the location-dependent traits that it generates and the estimate that it generates of whether the terminal is moving or stationary.

In accordance with process 1201, location engine 213 determines whether wireless terminal 201 is estimated to be moving based on the results of process 1106, and selects a method of generating a location estimate. If terminal 201 is estimated to be moving, control of execution proceeds to process 1202. If terminal 201 is estimated not to be moving, control of execution proceeds to process 1203.

In accordance with process 1202, location engine 213 performs location estimation based on pattern matching with time-series analysis. Process 1202 is described below and with respect to FIG. 13. In accordance with the illustrative embodiment of the present invention, location engine 213 performs the particular type of pattern matching described below. In some alternative embodiments of the present invention, however, location engine 213 performs a different type of pattern matching, or even a different type of location estimation that depends on wireless terminal 201 having been estimated as moving. In some other alternative embodiments of the present invention, location estimation based on pattern matching is performed regardless of whether wireless terminal 201 is estimated to be moving or not.

In accordance with process 1203, location engine 213 performs location estimation based on a technique that is alterative to the location estimation performed in accordance with process 1202. An alternative technique can be based on one or more of the following techniques, for example and without limitation: Cell-ID, Enhanced Cell ID (ECID), Observed Time Difference of Arrival (OTDOA), Global Positioning System (GPS), or Assisted GPS (A-GPS). It will be clear to those skilled in the art, after reading this specification, how to make and use a location estimation technique that does not require wireless terminal to be moving for optimal results, even though such a technique performed in accordance with process 1203 might provide results that are inferior to those provided by the location estimation technique performed in accordance with process 1202, at least under certain conditions.

Figure 13:
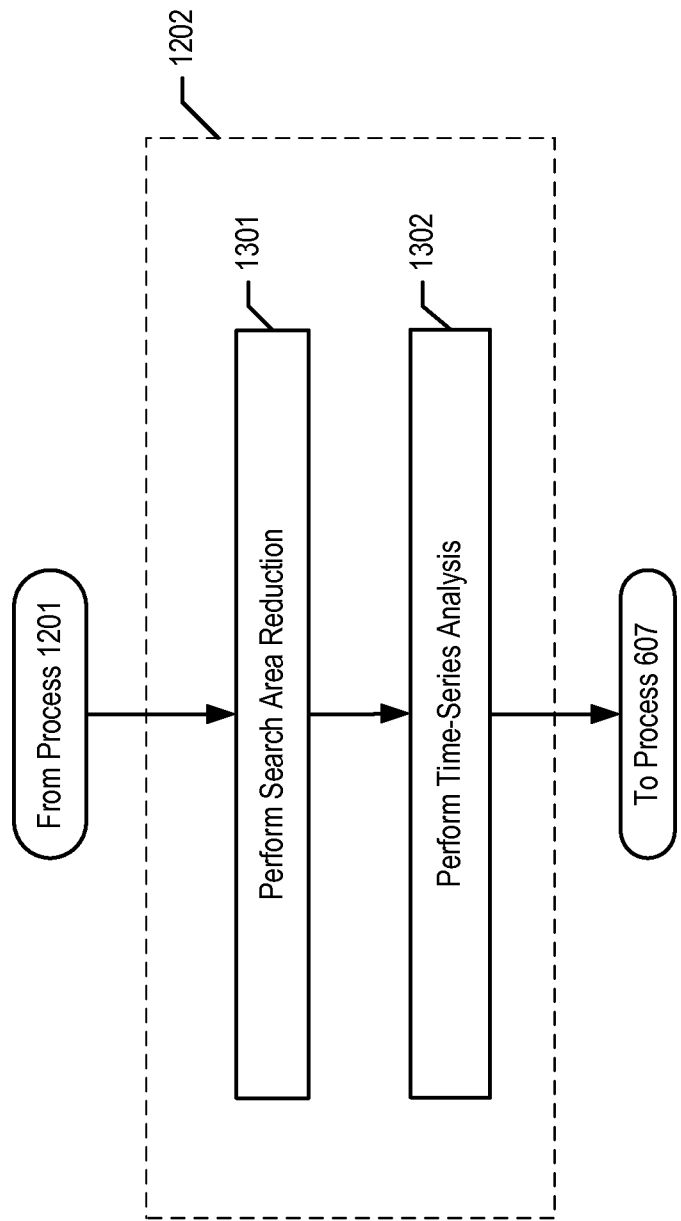
FIG. 13 depicts a flowchart of the salient processes performed in accordance with process 1202.

Generating an Estimate of the Location of Wireless Terminal 201 based on Pattern Matching—FIG. 13 depicts a flowchart of the salient processes performed in process 1202—generating an estimate of the location of wireless terminal 201 based on pattern matching.

In accordance with process 1301, location engine 213 performs a technique called "search area reduction" in preparation for process 1302. To understand what search area reduction is and why it is advantageous, a brief discussion of process 1302 is helpful.

In process 1302, location engine 213 performs a time-series analysis in order to estimate the probability that wireless terminal 201 is in each location at each of instants $H_1$ through $H_Y$ in the temporal interval 1T, wherein Y is a positive integer. Each probability is based on comparing the measurements of traits associated with wireless terminal 201 (i.e., the values generated in process 602) at each of instants $H_1$ through $H_Y$, to predicted values for those traits at those times. Each of the Y probability distributions provides a first estimate of the probability that wireless terminal 201 is in each location at each of instants $H_1$ through $H_Y$.

This analysis, however, requires generating Y multi-dimensional probability distributions, one for each of instants $H_1$ through $H_Y$. The process for generating each multi-dimensional probability distribution can be computationally intensive and the intensity depends on the number of locations that must be considered as possible locations for wireless terminal 201. When the number of locations that must be considered is small, the process can be performed quickly enough for many "real-time" applications. In contrast, when the number of locations that must be considered is large, the process can often take too long.

Nominally, all of the locations in geographic region 220 must be considered because, prior to process 1301, wireless terminal 201 could be in any location out of possibly thousands, millions, or billions of locations. The consideration of thousands, millions, or billions of locations for each instant by location engine 213 might take too long for many real-time applications.

Therefore, to expedite the performance of process 1302, location engine 213 performs one or more computationally-efficient tests that quickly and summarily eliminate many possible locations for wireless terminal 201 from consideration, and, therefore, summarily set to zero the probability that wireless terminal 201 is at those locations. This reduces the number of locations that must be fully considered in process 1302 and generally improves the speed with which the location estimation is performed.

Figure 14:
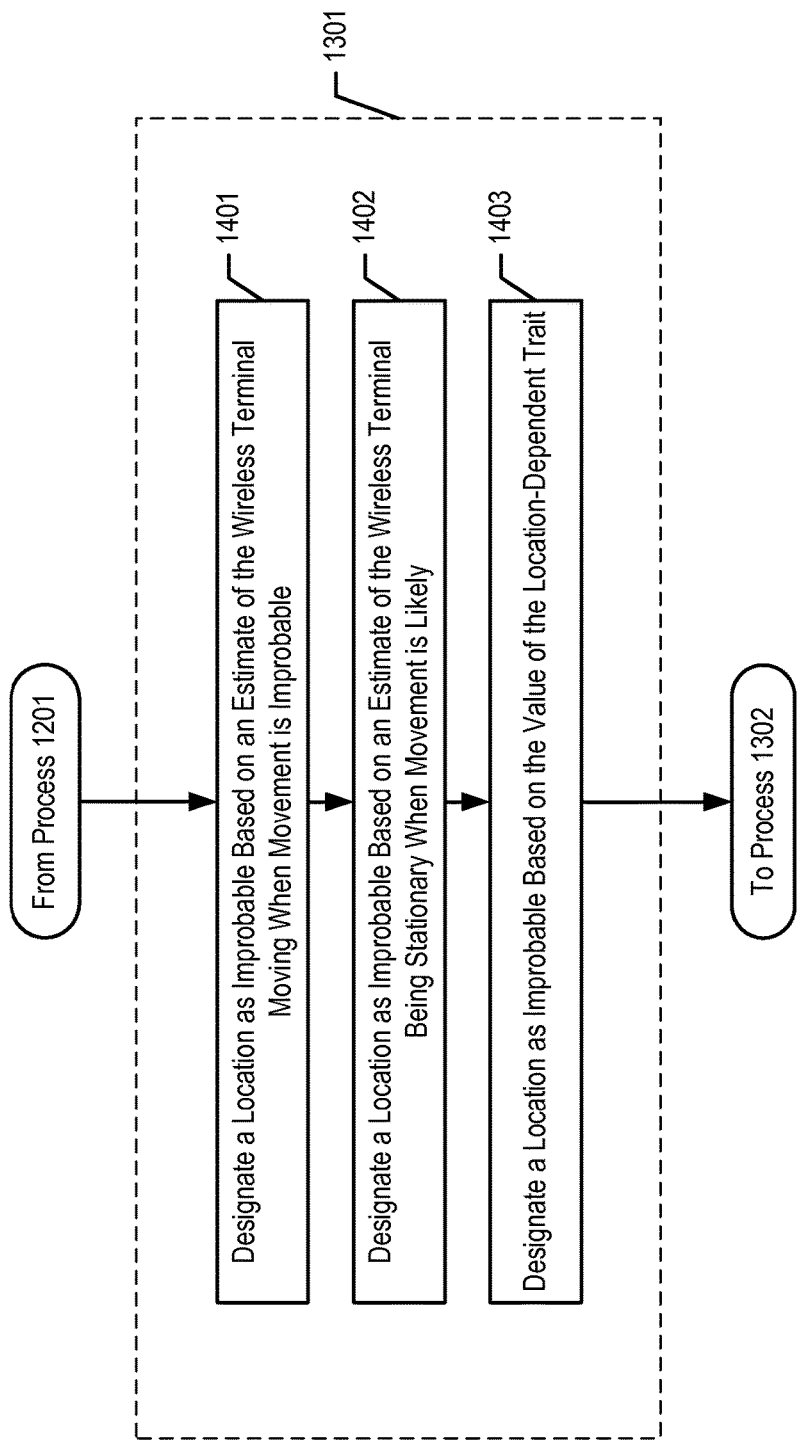
FIG. 14 depicts a flowchart of the salient processes performed in accordance with process 1301.

FIG. 14 depicts a flowchart of the salient processes performed in accordance with process 1301—search area reduction. In some embodiments of the present invention, location engine 213 uses additional techniques to those described below, in order to perform search area reduction.

In accordance with process 1401, location engine 213 designates a location as improbable based an estimate that wireless terminal 201 is moving when movement is improbable. The theory underlying this test is when the terminal is estimated to be moving, any location where movement is improbable is considered to be invalid. Although it is possible that the estimate of the wireless terminal being in motion might be wrong, the possibility of this occurring can be minimized by selecting the proper criteria for generating the estimate in process 605. Whether movement is improbable or not for a particular location is captured in accordance with process 701.

In accordance with process 1402, in those embodiments of the present invention in which process 1202 in FIG. 12 is performed even when wireless terminal 201 is estimated to be stationary, location engine 213 designates a location as improbable based on an estimate of wireless terminal 201 being stationary when movement is likely. The theory underlying this test is when the terminal is estimated to be stationary, any location where movement is likely is considered to be invalid. Although it is possible that the estimate of the wireless terminal being stationary might be wrong, the possibility of this occurring can be minimized by selecting the proper criteria for generating the estimate in process 605.

In accordance with process 1403, location engine 213 designates a location as improbable based on the value of the location-dependent trait generated in process 602. Various tests for accomplishing this are described in U.S. Pat. No. 7,257,414, which is incorporated herein by reference.

With respect to FIG. 13, a location that that is designated as improbable at instant $H_i$ by one or more of the foregoing processes is designated as improbable by process 1301 at instant $H_i$.

In accordance with process 1302, location engine 213 performs time-series analysis by generating each of the Y probability distributions for wireless terminal 201 at each of instants $H_1$ through $H_Y$. In doing so, server 213 estimates the location of wireless terminal 201 based on i) values that it receives of the location-dependent traits generated in process 602 and ii) one or more possible locations of wireless terminal 201 not designated as improbable in process 1301.

Location engine 213 first sets the probability of wireless terminal 201 being at a location at instant $H_i$ to zero (0) if the location was designated as improbable at instant $H_i$ by process 1301.

Location engine 213 then compares the received measures of the location-dependent trait to the predicted values for that trait associated with one or more possible locations of wireless terminal 201 not designated as improbable.

In accordance with the illustrative embodiment, server 213 performs this comparison by generating the Euclidean norm between the measurements of a trait and the predicted values for that trait at all instants and for all locations not designated as improbable by process 1301. To accomplish this, the Euclidean norm is generated between the measurements of the predicted values for those traits in Location-Trait Database 313. To accomplish this, the Euclidean norm is generated as described in Equation 1:

$$V(b,H_i) = \sqrt{\Sigma((E(b,H_i,N,W,Q) - M(b,H_i,N,W,Q)) \cdot \omega(Q))^2} \quad \text{(Eq. 1)}$$

wherein $V(b,H_i)$ is the Euclidean norm for Location b at instant $H_i$ based on the square root of the sum of the square of the differences between each (corrected and differential, where appropriate) trait measurement $M(b, H_i, N, W, Q)$ minus the predicted value $E(b, H_i, N, W, Q)$ for that trait, where $\omega(Q)$ is a weighting factor that indicates the relative weight to be given discrepancies in one trait versus discrepancies in the other traits.

Location engine 213 generates the un-normalized probabilities of the location of wireless terminal 201 at each location, based on the Euclidean norms generated above, as shown in Equation 2.

$$UP(b, H_i) = e^{\left(\frac{-V^2(b,H_i)}{\delta^2}\right)} \quad \text{(Eq. 2)}$$

wherein $UP(b,H_i)$ represents the un-normalized probability that wireless terminal 201 is in Location b at instant $H_i$, and wherein $\delta^2$ equals:

$$\delta^2 = \delta_E^2 + \delta_M^2 \quad \text{(Eq. 3)}$$

wherein $\delta_E^2$ is the square of the uncertainty in the error in Location-Trait Database and $\delta_M^2$ is the square of the uncertainty in the calibrated measurements. It will be clear to those skilled in the art, after reading this disclosure, how to generate $\delta^2$.

Location engine 213 normalizes the probabilities generated above, as described in Equation 4.

$$NP(b, H_i) = \frac{UP(b, H_i)}{\Sigma UP(b, H_i)} \quad \text{(Eq. 4)}$$

wherein $NP(b,H_i)$ represents the normalized probability that wireless terminal 201 is in Location b.

Location engine 213 generates an estimate of the location of wireless terminal 201 at instant $H_1$ based on the maximum likelihood function of the normalized probability distribution at instant $H_1$.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of estimating the location of a wireless terminal, the method comprising:
   measuring, by the wireless terminal, a sample of a predetermined form of energy in the vicinity of the wireless terminal;
   generating, by at least one of the wireless terminal and a location engine, a characterization of a predetermined type of variation in the vicinity of the wireless terminal in relation to a transmitted reference, wherein the characterization is based on the sample measured by the wireless terminal;
   generating an estimate of the probability that the wireless terminal is moving based on i) the characterization of the type of variation in the vicinity of the wireless terminal and ii) accounting for any energy emitted by the wireless terminal itself that is present in the sample;
   selecting a predetermined method of generating an estimate of the location of the wireless terminal, from a plurality of methods that includes a pattern-matching method having time-series analysis, wherein the selecting is based on the estimate of the probability that the wireless terminal is moving, and wherein the pattern-matching method having time-series analysis is selected only if the estimate of the probability that the wireless terminal is moving exceeds a threshold;

generating, by at least one of the wireless terminal and the location engine, the estimate of the location of the wireless terminal based on the method selected; and transmitting the estimate of the location to a location-based application.

2. The method of claim 1 wherein a predetermined source emits the transmitted reference.

3. The method of claim 2 wherein the source comprises a transmitter that the wireless terminal is already in communication with via an air-interface protocol, and the transmitted reference is in the form of radio waves transmitted by the transmitter.

4. The method of claim 2 wherein the source comprises an electroacoustic transducer of the wireless terminal, and the transmitted reference is in the form of sound waves transmitted by the wireless terminal via the electroacoustic transducer.

5. A method of estimating the location of a wireless terminal, the method comprising:

generating, by at least one of the wireless terminal and a location engine, a characterization of a predetermined type of variation in the vicinity of the wireless terminal, wherein the characterization is based on a sample of a predetermined form of energy measured in the vicinity of the wireless terminal;

generating, by at least one of the wireless terminal and the location engine, an estimate of the probability that the wireless terminal is moving based on the characterization of the type of variation in the vicinity of the wireless terminal;

selecting a predetermined method of generating an estimate of the location of the wireless terminal, from a plurality of methods that includes a pattern-matching method having time-series analysis, wherein the selecting is based on the estimate of the probability that the wireless terminal is moving, and wherein the pattern-matching method having time-series analysis is selected only if the estimate of the probability that the wireless terminal is moving exceeds a threshold;

generating, by at least one of the wireless terminal and the location engine, the estimate of the location of the wireless terminal based on the method selected; and transmitting the estimate of the location to a location-based application.

6. The method of claim 5 wherein the form of energy is radio waves, and wherein the type of variation is attributed to the Doppler effect.

7. The method of claim 5 wherein the form of energy is sound waves, and wherein the type of variation is attributed to the Doppler effect.

8. The method of claim 5 wherein the form of energy is radio waves, and wherein the type of variation is discernible across at least two successive sets of measurements of multiple radio-wave sources.

9. The method of claim 5 wherein the form of energy is visible light, and wherein the type of variation is fluctuation in light intensity.

10. The method of claim 5 further comprising receiving, by the location engine, a value of a location-dependent trait of an electromagnetic signal, wherein the value of the location-dependent trait is dependent on the location of the wireless terminal, and wherein the estimate of the location of the wireless terminal is further based on the value of the location-dependent trait.

11. A method of estimating the location of a wireless terminal, the method comprising:

receiving, by a location engine, a value of a location-dependent trait of an electromagnetic signal, wherein the value of the location-dependent trait is dependent on the location of the wireless terminal;

receiving, by the location engine, an estimate of the probability that the wireless terminal is moving, wherein the estimate of the probability that the wireless terminal is moving is based on a characterization of a predetermined type of variation in a measurement of a predetermined form of energy, the measurement having been made in the vicinity of the wireless terminal;

generating, by the location engine, an estimate of the location of the wireless terminal based on:

(1) the value of the location-dependent trait, and (2) a pattern-matching method that includes time-series analysis, wherein the generating of the estimate of the location is based on the pattern-matching method only if the estimate of the probability that the wireless terminal is moving exceeds a threshold; and transmitting the estimate of the location to a location-based application.

12. The method of claim 11 wherein the form of energy is radio waves, and wherein the type of variation is attributed to the Doppler effect.

13. The method of claim 11 wherein the form of energy is sound waves, and wherein the type of variation is attributed to the Doppler effect.

14. The method of claim 11 wherein the form of energy is radio waves, and wherein the type of variation is discernible across at least two successive sets of measurements of multiple radio-wave sources.

15. The method of claim 11 wherein the form of energy is visible light, and wherein the type of variation is fluctuation in light intensity.

16. The method of claim 11 wherein the estimate of the probability that the wireless terminal is moving is based on detecting that the wireless terminal is accelerating.

* * * * *